Oct. 28, 1958     P. M. KENDIG ET AL     2,857,757

TRANSDUCER TESTING APPARATUS

Filed Oct. 28, 1955

Paul M. Kendig
Miles T. Pigott
INVENTORS

BY G. L. O'Brien

United States Patent Office 2,857,757
Patented Oct. 28, 1958

2,857,757

TRANSDUCER TESTING APPARATUS

Paul M. Kendig and Miles T. Pigott, State College, Pa., assignors, by mesne assignments, to the United States of America as represented by the Secretary of the Navy Application October 28, 1955, Serial No. 543,631

8 Claims. (Cl. 73—67.2)

Our invention relates to electrical measuring devices and more particularly to means for determining parameters of transducers.

The principal object of our invention is to provide an apparatus for accurately, quickly, and conveniently indicating the values necessary for the determination of the electromechanical coupling coefficient of magnetostrictive materials.

Another object of our invention is to provide an apparatus for accurately, quickly, and conveniently indicating the values necessary for the determination of the effective electromechanical coupling coefficient of a transducer. As used herein, the word "transducer" is intended to be used in its broadest sense.

It is a still further object of our invention to provide a device that will allow a quick and convenient determination of the real component of the eddy current factor and hence an indication of the eddy current losses in magnetostrictive material.

Another object of our invention is to provide a device that will quickly, conveniently, and accurately determine the frequency at which the modulus of the motional impedance is a maximum and the frequency at which the modulus of the motional admittance is a maximum.

Figure 1:
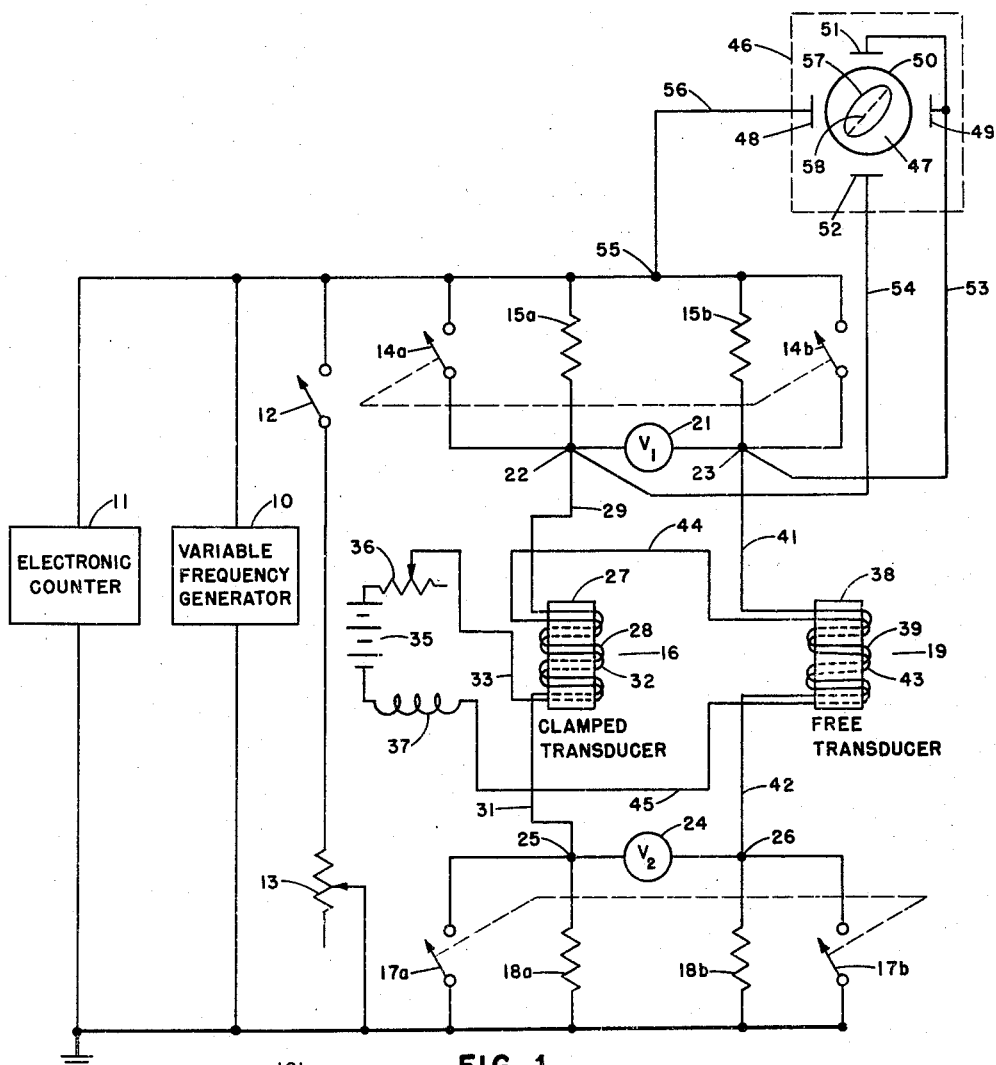
Figure 2:
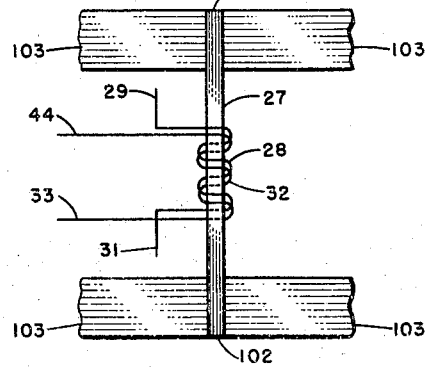

Other objects and many of the attendant advantages of our invention will be readily appreciated as the same becomes better understood by reference to the following detailed description when considered in connection with the accompanying drawing wherein:

Figure 1 is a schematic diagram of our invention with some parts in block form for convenience of illustration, and Figure 2 is a side elevation illustrating a means for suitably clamping a transducer lamination or the like as shown in Figure 1.

In the drawing which for the purpose of illustration shows only a preferred embodiment of the invention, and wherein similar reference characters denote corresponding parts throughout the several views, the numeral 10 designates a signal source having a constant voltage output and a variable frequency within the desired frequency limits, for example 1 to 100 kilocycles. The numeral 11 designates a conventional electronic counter which is connected in parallel with the variable signal source 10, as is the series combination of switch 12 and resistor 13. Resistor 13 need not necessarily be variable, the only requirement being that it have a value considerably less than the impedance of the transducer or transducers being tested. Switch 14a is connected in parallel with resistor 15a, said parallel combination being in series with the "clamped" transducer 16 and also in series with the parallel combination of switch 17a and resistor 18a. The parallel combination of switch 14b and resistor 15b, which preferably is of the same value as resistor 15a, is connected in series with the "free" transducer 19 and also in series with the parallel combination of switch 17b and resistor 18b, which preferably is of the same value as resistor 18a.

The clamped transducer 16 and its associated resistors 15a—18a and switches 14a—17a are connected in parallel with the free transducer 19 and its associated resistors 15b—18b and switches 14b—17b, and said parallel arrangement is connected in series with the signal source 10 substantially as shown in Figure 1. Switches 14a and 14b may be ganged so that they are opened and closed simultaneously, as may also be the case with switches 17a and 17b. Resistors 15a and 15b preferably are substantially pure resistances of the same value and have a value considerably greater than the impedance modulus of the transducer or transducers being tested. Resistors 18a and 18b are also preferably substantially pure resistances, but should have a value less than the impedance modulus of the transducer or transducers being tested.

A suitable voltmeter 21, such as a vacuum tube voltmeter, is connected between points 22—23 such that the difference in potential between these two points may be accurately determined. As a general rule the difference in potential between points 22—23 will not be large, hence a sensitive voltmeter is preferred that will measure relatively small voltage differences and that will not introduce errors into the system, such as for example providing a path for current flow between two points wherein such current flow is undesirable.

A suitable voltmeter 24, similar to voltmeter 21, is connected between points 25—26 to determine the difference in potential between the said two points. Voltmeter 24 is preferably the same or similar to voltmeter 21 for the reason that the requirements for voltmeter 21 apply equally as well to voltmeter 24.

As shown in Figure 1 the "clamped" transducer 16 is comprised of a sample 27 of magnetostrictive material having wound thereon a static polarization coil 32 and a magnetic driving coil 28 with wires 29—31 connected respectively to points 22—25. One terminal of a suitable current source 35, such as a battery or the like, is connected to a variable resistance 36 which is connected in series with coil 32 by wire 33. Coil 32 is connected in series with coil 43 by wire 44, the remaining end of coil 43 being connected in series with a suitably large inductance 37 by wire 45. The remaining end of inductance 37 is connected to the remaining terminal of the current source 35, thus completing a series circuit wherein the same current flows through both coil 32 and coil 43, said current being adjustable within the limits of resistor 36. It is not important whether the connections of the current source 35 are as shown or reversed, it only being necessary that the current through coils 32—43 be the same and that the coils be wound such that samples 27—38 are magnetically polarized the same.

A large inductance in series with the current source 35 is desirable in the polarization coil circuit in order to render negligible any impedance reflected back into the driving coils. Suitable means for clamping sample 27 is discussed more fully later herein in connection with Figure 2. The "free" transducer 19 is comprised of a sample 38 of magnetostrictive material having the same or substantially the same history, dimensions, materials, configuration, etc., as sample 27. A magnetic driving coil 39, having wires 41—42 connected respectively to points 23—26 and substantially identical in all respects with driving coil 28, is wound on sample 38. A static polarization coil 43 is wound on sample 38, and as previously mentioned is connected in series with coil 32 by wires 44—45, said coil 43 being substantially identical in all respects with coil 32. Sample 38 is so mounted and coils 39—43 wound thereon in such a manner that the vibratory motion of sample 38 when magnetically driven is substantially unrestrained, such as for example by suspending sample 38 in space by means of two or more threads, highly flexible wires or the like.

The numeral 46 indicates a cathode ray oscilloscope having a cathode ray tube 50, said cathode ray tube having a face portion 47, horizontal deflection plates 48—49, and vertical deflection plates 51—52. Vertical plate 51 and horizontal plate 49 are connected together and connected to point 23 by wire 53. Vertical plate 52 is connected to point 22 by wire 54 and horizontal plate 48 is connected to point 55 by wire 56. It may now be obvious that since the voltage across resistors 15a—15b is real and the voltage across points 22—23 is complex, the electron beam of the cathode ray tube 50 will trace out on face 47 a Lissajous figure, such as for example ellipse 57, the proper phase relationship, frequency, and amplitude being present.

As may now be obvious, when switches 12, 14a, and 14b are open and switches 17a—17b are closed the above described components form a constant current circuit with regard to the clamped transducer 16 and the free transducer 19. Since the resistance of resistors 15a—15b is considerably larger than the impedance modulus of the transducers 16—19, the change in impedance of the transducers due to a change in frequency will have a negligible effect on the over-all impedance of the circuit or their respective branches, hence the current in these branches will remain substantially constant. As used herein "impedance modulus" is defined as the magnitude of the impedance being considered. As may also now be obvious, if a voltmeter were connected across each transducer a reading would be obtained that would be directly proportional to the impedance modulus of each transducer, hence voltmeter 21 connected between the positive sides of each transducer at points 22—23 will give a reading $V_1$ proportional to the vector difference modulus between the voltages at these points and the modulus of the vector difference between the impedances of the two transducers. It may now be obvious that this is the modulus of the motional impedance.

When switches 12, 14a and 14b are closed and switches 17a—17b are open the circuitry of Figure 1 will be converted to a so-called constant voltage circuit since resistor 13 is of such a small value as to load the signal source 10 to such a point that any variation in impedance of the transducers 16—19 will not substantially affect the line current and hence the voltage across each transducer branch circuit. Since resistors 15a—15b are shorted out or by-passed by the closing of switches 14a—14b, the current through resistors 18a—18b will be dependent on the impedance of each transducer. It may now be obvious that voltmeters connected across resistor 18a and 18b will give a reading directly proportional to the admittance of each transducer and that voltmeter 24, connected between points 25—26, will give a reading directly proportional to the vector difference modulus between the voltages at points 25—26 and hence the modulus of the vector difference between the admittances of the two transducers. It may now be obvious that this is the modulus of the motional admittance.

In view of the previous discussion it may now be obvious that when switches 12, 14a, and 14b are open and switches 17a—17b are closed the reading of voltmeter 21 will vary in precisely the same manner as the vector difference modulus between the impedance of transducer 16 and transducer 19, i. e., when the difference modulus is maximum the reading on voltmeter 21 will be maximum and vice versa. Further, when switches 12, 14a, and 14b are closed and switches 17a—17b are open, the reading of voltmeter 24 will vary in precisely the same manner as the vector difference modulus between the admittance of transducer 16 and transducer 19, i. e., when the difference modulus is maximum the reading on voltmeter 24 will be maximum and vice versa.

The value of the effective electromechanical coupling coefficient for electromagnetic type coupling, such as for example, electrodynamic, magnetostrictive, etc., is given by:

$$k^2_{eff} = 1 - \left(\frac{f_r}{f_y}\right)^2$$

and the value of the effective electromechanical coupling coefficient for electrostatic type coupling, such as for example, piezoelectric, condenser, etc., is given by:

$$k^2_{eff} = 1 - \left(\frac{f_y}{f_r}\right)^2$$

where $k_{eff}$ is the effective coefficient of electromechanical coupling, $f_r$ is the frequency at which the motional impedance modulus takes on its maximum, and $f_y$ is the frequency at which the motional admittance modulus takes on its maximum. If the mechanical Q of the transducer is about 10 or higher, $f_r$ and $f_y$ are not significantly different from the resonant frequency and the frequency of maximum efficiency of the transducer. For the case of transducers other than magnetostrictive, $f_y$ may differ from the frequency of maximum efficiency, but for all practical purposes this has no effect on the determination of $k^2_{eff}$. Since the mechanical Q of a transducer generally greatly exceeds 10 the above condition is easily met.

The electromechanical coupling coefficient $k$, which is characteristic of the material, can best be determined by measurements on rings for the reason that for some other types of configuration the quantity $$1 - \left(\frac{f_r}{f_y}\right)^2$$

or $$1 - \left(\frac{f_y}{f_r}\right)^2$$

as determined by measurement is only an effective electromechanical coupling coefficient.

It can also be shown from the literature that:

$$k^2 x_r = 1 - \left(\frac{f_r}{f_y}\right)^2$$

and $$k^2 x_r = 1 - \left(\frac{f_y}{f_r}\right)^2$$

where $k$ is the electromechanical coupling coefficient and $x_r$ is the real component of the eddy current factor. Therefore, it is preferred to let $k^2 x_r$, which is characteristic of the material, be determined by measurements on ring samples and let $k^2_{eff}$, measured on any other configuration, serve as a measure of how effectively the electrical circuit is coupled to the mechanical circuit. It will be more fully explained later herein how $x_r$ may be more quickly and easily determined for laminations, such as for example rings and such other types wherein $x_r$ is measurable, thus allowing a substantially accurate determination of the electromechanical coupling coefficient of the sample.

Our invention is used in the following manner. For the case for testing magnetostrictive laminations it is considered necessary that the clamped sample 27 and the free sample 38 be substantially identical and have substantially the same history and that the magnetic driving coils 28—39 and the static polarization coils 32—43 be respectively identical with regard to geometry, turns and relation to their respective magnetostrictive samples. The clamped sample 27 must be effectively clamped by suitable means, such as for example that shown in Figure 2, such that all vibratory motion is effectively eliminated. As shown in Figure 2 each end portion 101—102 of the sample 27 is rigidly held by restraining members 103 in a rigid and vice-like manner (the mounting means for members 103 not being shown) such that substantially all vibratory motion is eliminated. For samples having other than a rectangular form as shown, as for example rings, other and suitable means of clamping may be used. For the case of rings or the like, one or more rings may be placed in a thin wall toroidal plastic box having a rectangular cross section and embedded in an oil base molding clay. If more than one ring is used then each ring should preferably be separated and embedded in the molding clay. It may be noted here that when one or more samples are used in the clamped transducer, the same number of samples must be used in the free transducer. The free sample 38 must be substantially unrestrained and have its magnetic driving coil 39 and polarization coil 43 in an identical position and relationship with regard to itself as the magnetic coil 28 and polarization coil 32 are with regard to the clamped sample 27.

It may now be obvious that when the clamped sample 27 and the free sample 38 are assembled in the manner described above and the driving coils 28—39 connected respectively to points 22—25 and points 23—26, the impedance and admittance loci of the driving coil 28 surrounding the clamped sample 27 will be substantially identical with the clamped impedance and admittance loci of the driving coil 39 surrounding the free sample 38, thus allowing them to be compared in the manner and fashion described hereinbelow.

Resistor 36 is first adjusted for a particular value of polarization current through coils 32—43. Switches 12, 14a, and 14b are then opened and switches 17a—17b are closed and the variable signal source 10 is varied from a frequency substantially below the frequency $f_r$ to a frequency substantially above the frequency $f_r$. As the frequency is varied from a low value to a high value the voltage $V_1$ of voltmeter 21 will rise to a maximum value and then fall off, as previously explained, for the reason that the motional impedance modulus rises from a zero value to a maximum value and then falls off to a zero value again, the maximum being obtained at the frequency $f_r$; hence when voltage $V_1$ is maximum the critical frequency $f_r$ is read directly on the electronic counter 11 and recorded. Switches 12, 14a, and 14b are then closed and switches 17a—17b are opened. The frequency is then again varied in the manner previously described until a maximum voltage $V_2$ is indicated on voltmeter 24. The reading of voltmeter 24 will rise to a maximum value and then fall off, as previously explained for the reason that the motional admittance modulus rises from a zero value to a maximum value and then falls off to a zero value again, the maximum being attained at the frequency $f_y$. When voltage $V_2$ is maximum the frequency $f_y$ is read on the electronic counter 11 and recorded. The two frequencies $f_r$ and $f_y$ are then substituted into the formula for $k_{eff}$ and the equation solved for a value of $k_{eff}$. Since the maximum value of $k$ and $k_{eff}$ is dependent on an optimum value of static polarization current the above procedure is followed until the maximum value of $k_{eff}$ is secured. We have found that $k_{eff}$ can be determined in a matter of three minutes or less; hence the determination of the optimum value for the polarization current is a very simple and short procedure.

It may now be obvious that for production testing, when an optimum value of polarization current has been determined the effective electromechanical coupling coefficient for any number of samples or laminations having the same history may be quickly, easily, and accurately determined by substituting them for the original free sample and performing the above described steps for determining $f_r$ and $f_y$, substituting the values of $f_r$ and $f_y$ into the equation for $k_{eff}$ previously given herein and solving for $k_{eff}$. We have found that the maximum voltage indication at the frequency $f_r$ and $f_y$ inherently associated with our invention is also useful for detecting undesirable multiple resonant frequencies generally associated with coupled modes of vibration. The presence of such multiple resonant frequencies makes it impossible to get reliable values for the effective electromechanical coupling coefficient by any method and may reduce the efficiency of the transducer, hence laminations or transducers having such multiple resonant frequencies should be rejected or classified as less desirable. The presence of such multiple resonant frequencies, especially a small extra resonance, is difficult to detect by conventional methods, such as for example with an impedance or admittance bridge, hence conventional bridge methods for the determination of $k_{eff}$ may unknowingly give erroneous results. However, with our invention, such multiple resonant frequencies can be easily and quickly detected by observing voltages $V_1$ of voltmeter 21 for all frequencies in the neighborhood of resonance, all extra resonances appearing as multiple maxima.

Our invention, with slight modifications may also be used to determine $k_{eff}$ for assembled transducers wherein it is impossible to suitably clamp the transducer. We have found that the clamped transducer may be replaced by a properly designed impedance network wherein the impedance of said network varies slowly in the region of the critical frequencies of the transducer or transducers being tested and that has a value substantially equal to the blocked or clamped impedance modulus of the transducer or transducers as these critical frequencies. The parameters of such a network may be initially determined by plotting the real and imaginary components of the impedance of the free transducer as functions of frequency over a wide range of frequencies. An impedance network may be designed in the conventional manner that has an impedance locus and an admittance locus over the frequency range, including $f_r$ and $f_y$, that is substantially the same as the blocked impedance locus and admittance locus of the free transducer, which is to say, the transducer to be tested. Such a network may be comprised of a suitable resistance and inductance in series or a combination of resistors, capacitors, and inductors. Such an impedance network designed according to and having an impedance locus substantially the same as the blocked impedance locus of the free transducer over a frequency range including at least $f_r$ and $f_y$ is substituted for transducer 16 and is connected between points 22—25. The critical frequencies $f_r$ and $f_y$ for the free transducer may now be determined in the same manner as hereinbefore described for determining $f_r$ and $f_y$.

Obviously a polarizing current is not necessary for the substitute impedance network and may not be necessary for the free transducer since such may be permanently biased by permanent magnets. Where such is the case the procedure for determining the optimum value of the polarization current may be eliminated since it has previously been determined or fixed. As was previously explained, the values of $f_r$ and $f_y$ may now be substituted into the formula in order to determine $k_{eff}$.

It may now be obvious that with the substitution of a suitable impedance network for the clamped transducer, the presence of multiple resonant frequencies, the critical frequencies $f_r$ and $f_y$, and the effective electromechanical coupling coefficient of any number of transducers having the same history and not amendable to being clamped may be easily and quickly determined, the same being equally as applicable to electrostatic type transducers as to electromagnetic type transducers.

We have found that by use of our invention the frequencies $f_r$ and $f_y$ for transducers or laminations can be determined in less than three minutes. It has also been our experience that it generally takes one to two hours to obtain the same information by conventional methods, such as for example with an impedance bridge, regardless of the working formula, and on this basis we claim a time saving ratio of approximately 30:1. Further, since frequencies can be determined with an electronic counter to within 1 cycle per second, and if sufficiently sensitive voltmeters are used as recommended herein, an accuracy may be obtained that is as great or greater than that obtained by the conventional use of impedance and admittance bridges.

We have also found that our invention is most useful for testing transducers or magnetostrictive materials having the same history, which is to say that their material, dimensions, configuration, and method of construction, etc., are the same. Composition, annealing temperature, rolling direction, magnetic polarizing field, configuration, etc., all affect the $k$ and the value of the frequency $f_r$ of a magnetostrictive material; hence consistant and accurate results would not generally be secured by comparing magnetostrictive materials or transducers not having the same or substantially the same history.

The previously described means and methods are most useful for the determination of the effective electromechanical coupling coefficient of a transducer as distinguished from the electromechanical coupling coefficient which is characteristic of the material. As previously shown, the determination of the electromechanical coupling coefficient $k$ involves the real part of the eddy current factor $x_r$. A determination of $x_r$ for flat lamina wherein $x_r$ is determinable, such as for example ring laminations, may be secured by use of our invention in considerably less time than is necessary by use of the conventional bridge method.

It has been shown in the literature that the reversible permeability $\mu_r$ of a magnetostrictive material may be replaced by the term:

$$\mu_r x = \mu_r x_0 \angle \delta$$

where $x_0$ is the modulus of the complex eddy current factor and $x_0 \angle \delta$ is the complex eddy current factor in polar form. It is further established in the literature that $x_0 \angle \delta$ is related to the dip angle of the motional impedance circle in that the said dip angle $\theta$ is the angle between the principal diameter of the motional impedance circle and the real axis and is equal to $2\delta$. The angle $\theta$ is determined in the following manner. Switches 12, 14a, 14b are opened and switches 17a—17b are closed just as in the manner for determining $f_r$. As and for the reasons previously explained, an ellipse 57 will appear on face 47 of the cathode ray tube 50. The frequency of the variable signal source 10 is varied until a maximum reading $V_3$ is obtained on voltmeter 21 and this maximum reading $V_3$ is recorded. It may be noted that the voltage $V_3$ is substantially identical with voltage $V_1$, hence if desired this step may be omitted and voltage $V_1$ used in place of $V_3$, assuming of course that it has previously been determined in the determination of $f_r$.

The frequency of the variable signal source 10 is then decreased until the ellipse 57 becomes a straight line 58 and the voltage $V_4$ of voltmeter 21 is noted and recorded. Since the maximum motional impedance vector occurs at voltage $V_3$ and since the motional impedance vector is parallel to the real axis at voltage $V_4$, as is shown by the degeneration of ellipse 57 to a straight line 58, it may now be obvious that the angle whose cosine is equal to $V_4/V_3$ is substantially equal to twice an angle $\delta$ of the complex eddy current factor. It is now only necessary to determine one-half of the angle $\theta$, which angle is equal to $\delta$, and read directly from a universal graph which plots both $x_r$ and $\delta$ parametrically as functions of the ratio $f/f_c$, where $f/f_c$ is the ratio of the frequency being used to the characteristic frequency of the material. If desired, such a universal graph may be plotted by solving simultaneously, in terms of $\delta$ and $x_r$, the equations:

$$(1) \quad A = \sqrt{\frac{f}{2f_c}}$$

$$(2) \quad A(x_r - x_I) = \frac{\tanh A + \tan^2 A \tanh A}{1 + \tanh^2 A \tan^2 A}$$

$$(3) \quad A(x_r - x_I) = \frac{\tan A \tanh^2 A - \tan A}{1 + \tanh^2 A \tan^2 A}$$

$$(4) \quad x_r = x_0 \cos \delta$$

$$(5) \quad x_I = x_0 \sin \delta$$

where $f$ is the particular frequency under consideration, $f_c$ is the characteristic frequency of the material and is dependent upon the resistivity, reversible permeability, and thickness of the material, $x_r$ is the real component of the complex eddy current factor, $x_I$ is the reactive component of the complex eddy current factor, $x_0$ is the magnitude of the complex eddy current factor, and $\delta$ is the phase angle of the magnitude $x_0$ of the complex eddy current factor.

While we have shown and described particular forms of embodiment of our invention and described particular methods for use of our invention, we are aware that various minor changes therein will readily suggest themselves to others skilled in the art without departing from the spirit and scope of our invention.

It is, therefore, to be understood that within the scope of the appended claims our invention may be practiced otherwise than as specifically described.

We claim:

1. In a device for measuring the electrical characteristics of an electrical transducer the combination comprising: a variable frequency signal source; a first transducer having substantially the same history as the transducer to be tested; means to damp vibratory motion of said first transducer; constant current circuit means connecting said first transducer, said second transducer to be tested, and said signal source for supplying a substantially constant current to said transducers whereby a voltage proportional to the impedance difference of said first transducer and the transducer to be tested is provided between said transducers; and means to measure said voltage whereby as the frequency of said signal source is varied the resonant frequency of the transducer to be tested may be determined when said voltage has a maximum value.

2. In a device for measuring the electrical characteristics of an electrical transducer the combination comprising: a variable frequency signal source; a first transducer having substantially the same history as the transducer to be tested; means to damp vibratory motion of said first transducer; constant voltage circuit means connecting said first transducer, said transducer to be tested, and said signal source for supplying a substantially constant voltage to said transducers whereby a voltage proportional to the admittance difference of said first transducer and the transducer to be tested is provided between said transducers and means to measure said voltage whereby as the frequency of said signal source is varied the presence of one or more resonant frequencies of the transducer to be tested may be indicated when said voltage has a maximum value.

3. In a device for measuring electrical characteristics of an electrical transducer having critical frequencies and a blocked impedance the combination comprising: a variable frequency signal source; means to measure the frequency of said signal source; an electric network having an impedance that varies with frequency, said impedance being characterized by variation and magnitude at the critical frequencies substantially identical with the blocked impedance variation of the transducer being tested; circuit means connecting said network and said transducer being tested in parallel and in series with said signal source for supplying a substantially constant current and a substantially constant voltage to said network and said transducer; means for modifying said circuit means to selectively supply said substantially constant current and said substantially constant voltage to said network and said transducer whereby a first voltage proportional to the impedance difference of said network and said transducer and a second voltage proportional to the admittance difference of said network and said transducer is respectively provided between said network and said transducer; and means to measure said first and second voltage whereby as the frequency of the signal source is varied the critical frequencies of the transducer being tested may be determined when said first and second voltage respectively have a maximum value.

4. In a device for measuring electrical characteristics of an electrical transducer having critical frequencies the combination comprising: a variable frequency signal source; means to measure the frequency of said signal source; a first transducer having substantially the same history as the transducer to be tested; means to damp said first transducer whereby the vibratory motion of said first transducer when actuated is considerably less than that of the transducer being tested; circuit means connecting said first transducer and said transducer being tested in parallel and in series with said signal source for supplying a substantially constant current and a substantially constant voltage to said transducers; means for modifying said circuit means to selectively supply said substantially constant current and said substantially constant voltage to said transducers whereby a first voltage proportional to the impedance difference of said first transducer and said transducer being tested and a second voltage proportional to the admittance difference of said first transducer and said transducer being tested is respectively provided between said transducers; and means to measure said first and second voltage whereby as the frequency of the signal source is varied the critical frequencies of the transducer being tested may be determined when said first and second voltage respectively have a maximum value.

5. The combination as described in claim 4 wherein said first transducer is comprised of a thin magnetostrictive element having a first end portion and second end portion; and clamping means affixed in abutting relationship with said first and said second end portions to effectively restrain the magnetostrictive action of said first transducer.

6. The combination as described in claim 5 wherein the transducers additionally include a static polarization circuit whereby said first transducer and the transducer to be tested may be statically polarized, said static polarization circuit being comprised of a first polarization coil encircling a portion of said first transducer, a second polarization coil in series with said first polarization coil and adapted to encircle a portion of the transducer to be tested, an inductance in series with said first and second polarization coils, and a current source adapted to supply a polarizing current to said first and second polarization coils; a first magnetic driving coil having an input terminal and encircling said first transducer; and a second magnetic driving coil having an input terminal and adapted to encircle the transducer to be tested.

7. The combination as described in claim 6 additionally including first and second resistors having individual input terminals and connected in series respectively with the input terminals of said first and second magnetic driving coils; a cathode ray oscillograph, said cathode ray oscillograph having at least a cathode ray oscilloscope including a screen and means for producing a cathode beam adapted to impinge thereon, means to horizontally deflect said cathode beam and means to vertically deflect said cathode beam, said horizontal deflecting means being comprised of a first horizontal deflecting element and a second horizontal deflecting element, said vertical deflecting means being comprised of a first vertical deflecting element and a second vertical deflecting element, one horizontal deflecting element and one vertical deflecting element being connected between said first resistor and said first magnetic driving coil, the remaining vertical deflecting element being connected between said second resistor and said second magnetic driving coil, and the remaining horizontal deflecting element being connected to the input terminals of said first resistor and said second resistor whereby the real voltage across said first resistor and said second resistor may be visually compared with said first voltage as the frequency of said signal source is varied.

8. In a device for measuring the resonance frequency of an electrical transducer wherein the unblocked impedance of the transducer being tested is compared with the blocked impedance of a similar transducer having substantially the same history, the combination comprising: a variable frequency signal source; means to determine the frequency of said frequency source; a first transducer having substantially the same history as the transducer being tested; means to damp said first transducer whereby the vibratory motion of said first transducer when actuated is considerably less than that of the transducer being tested; circuit means connecting said first transducer and said transducer being tested in parallel and in series with said signal source whereby a constant current circuit for supplying a substantially constant signal from said signal source to said transducers is provided for producing between said transducers a voltage proportional to the impedance difference of said transducers; and means to measure said voltage whereby as the frequency of said signal source is varied the resonant frequency of the transducer being tested may be determined when said voltage has a maximum value.

References Cited in the file of this patent

UNITED STATES PATENTS

| | | |
|---|---|---|
| 1,880,425 | Flanders | Oct. 4, 1932 |
| 2,648,979 | Cornett | Aug. 18, 1953 |

OTHER REFERENCES

The Journal of the Acoustical Society of America, vol. 21, No. 3, May 1949, pp. 177–182.